April 15, 1969     R. G. McINTYRE     3,438,601
AIR CREW ESCAPE AND SURVIVAL SYSTEM
Filed Dec. 18, 1967
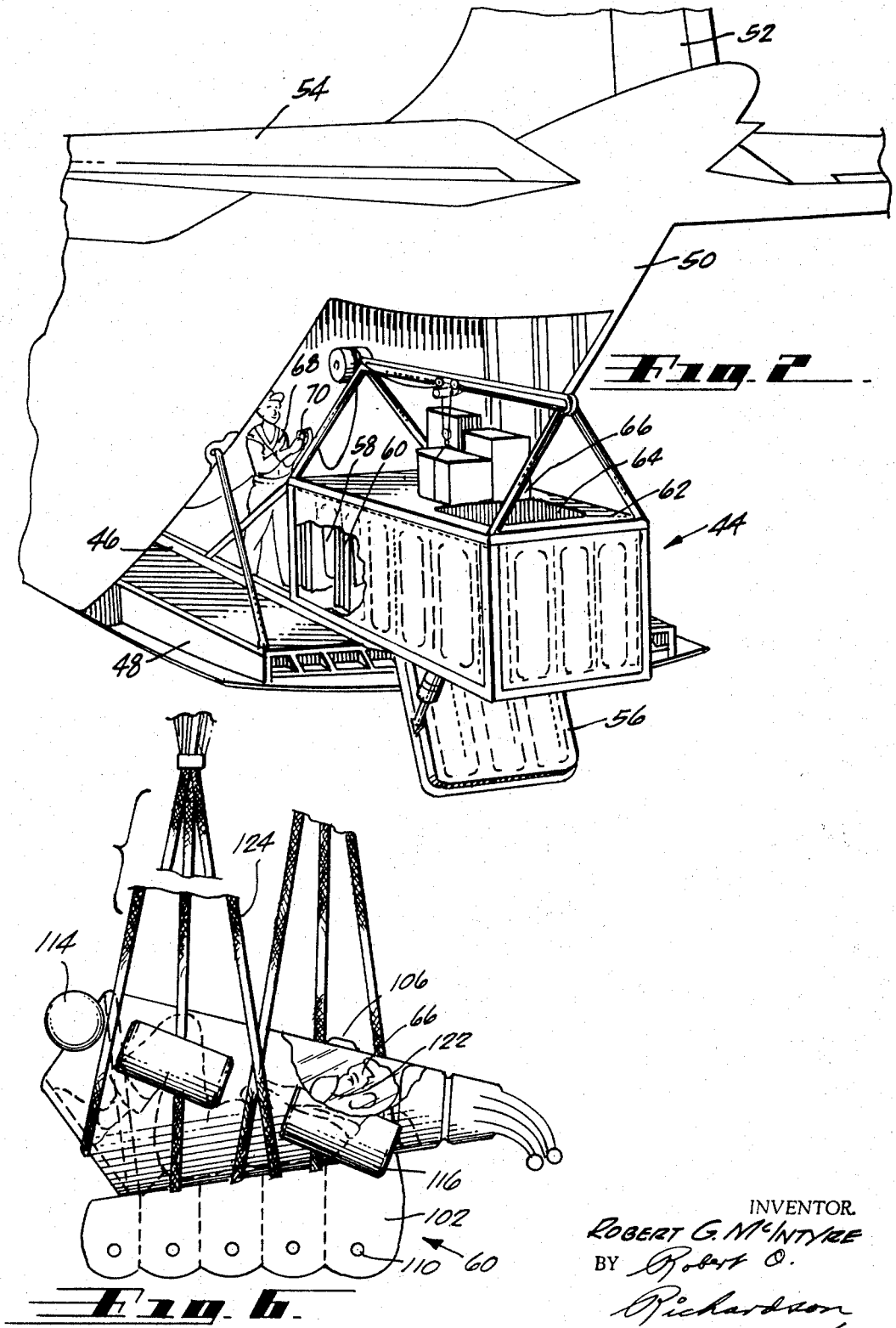
INVENTOR.
ROBERT G. McINTYRE
BY Robert O. Richardson
-ATTORNEY-

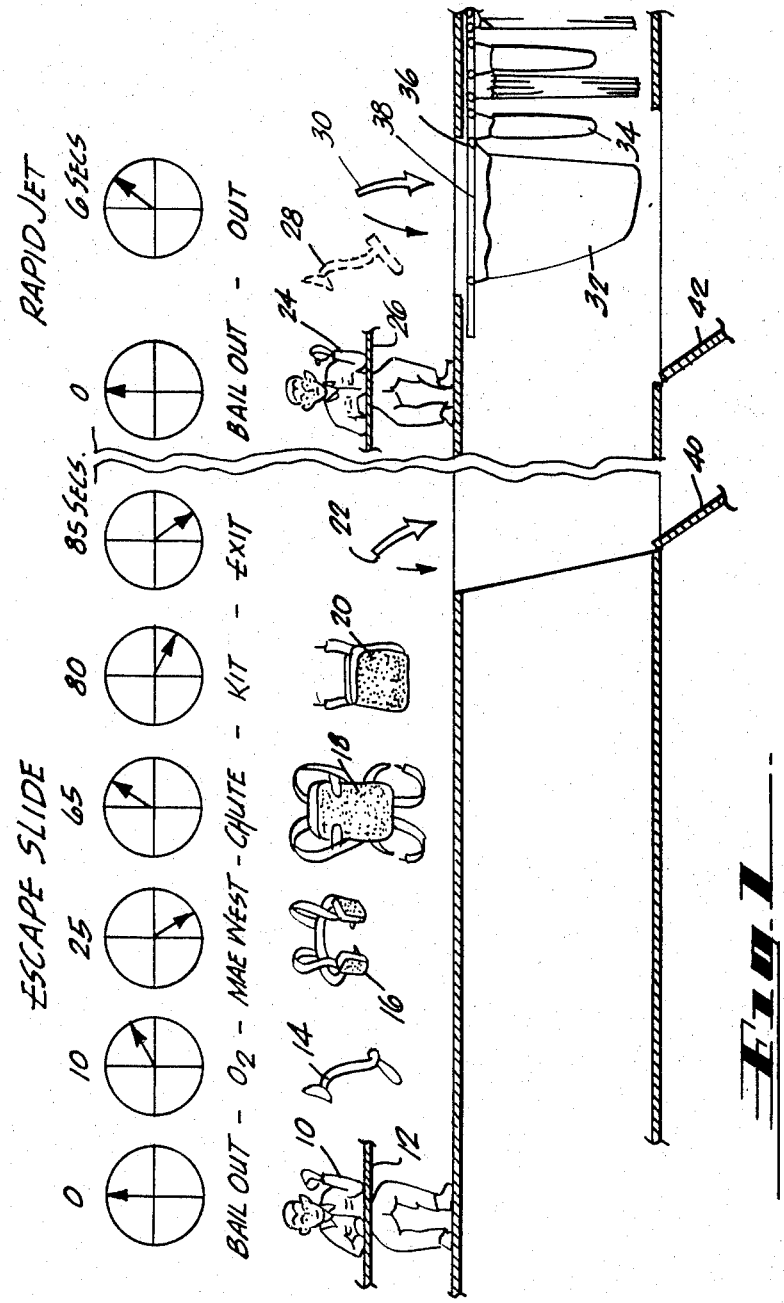

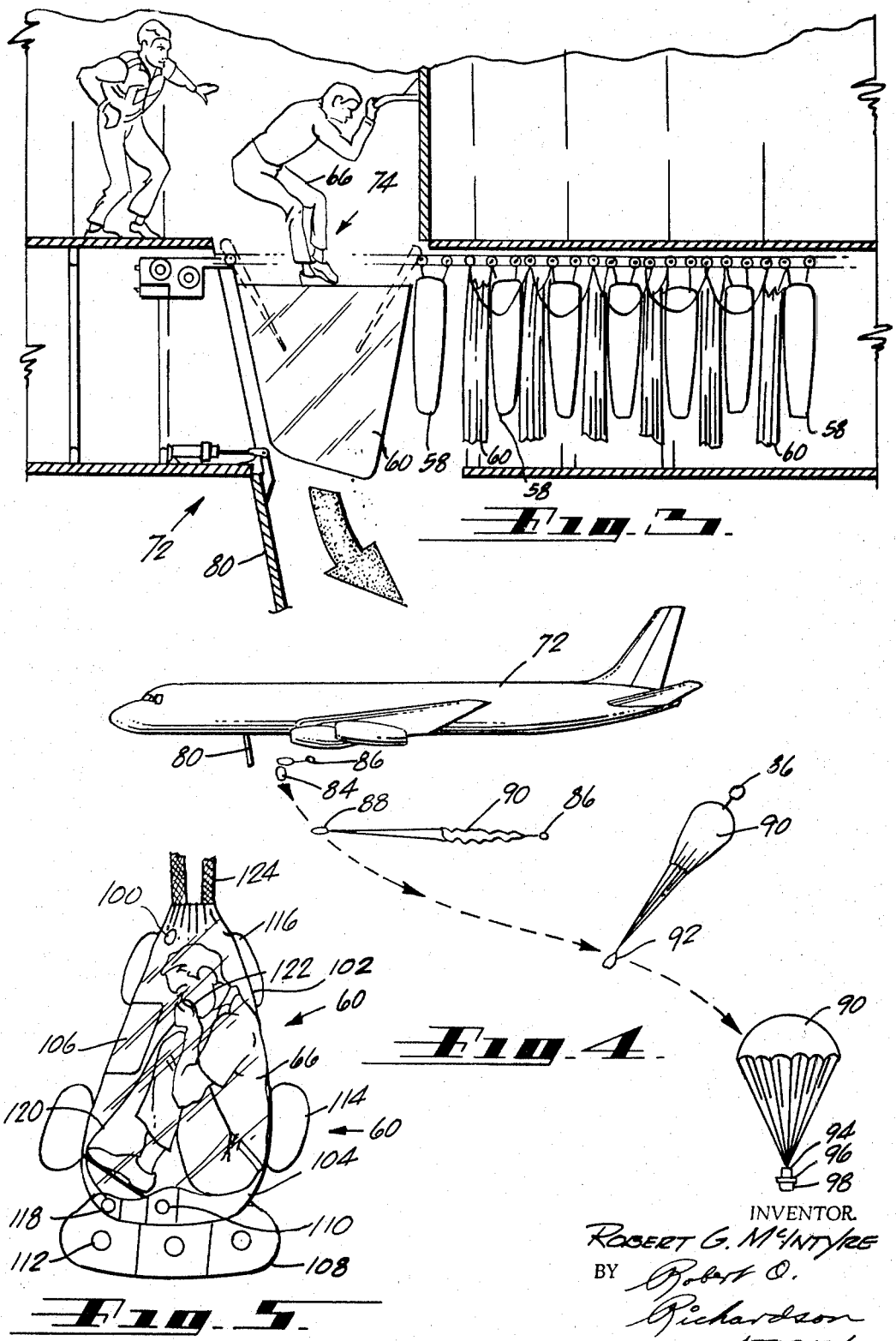

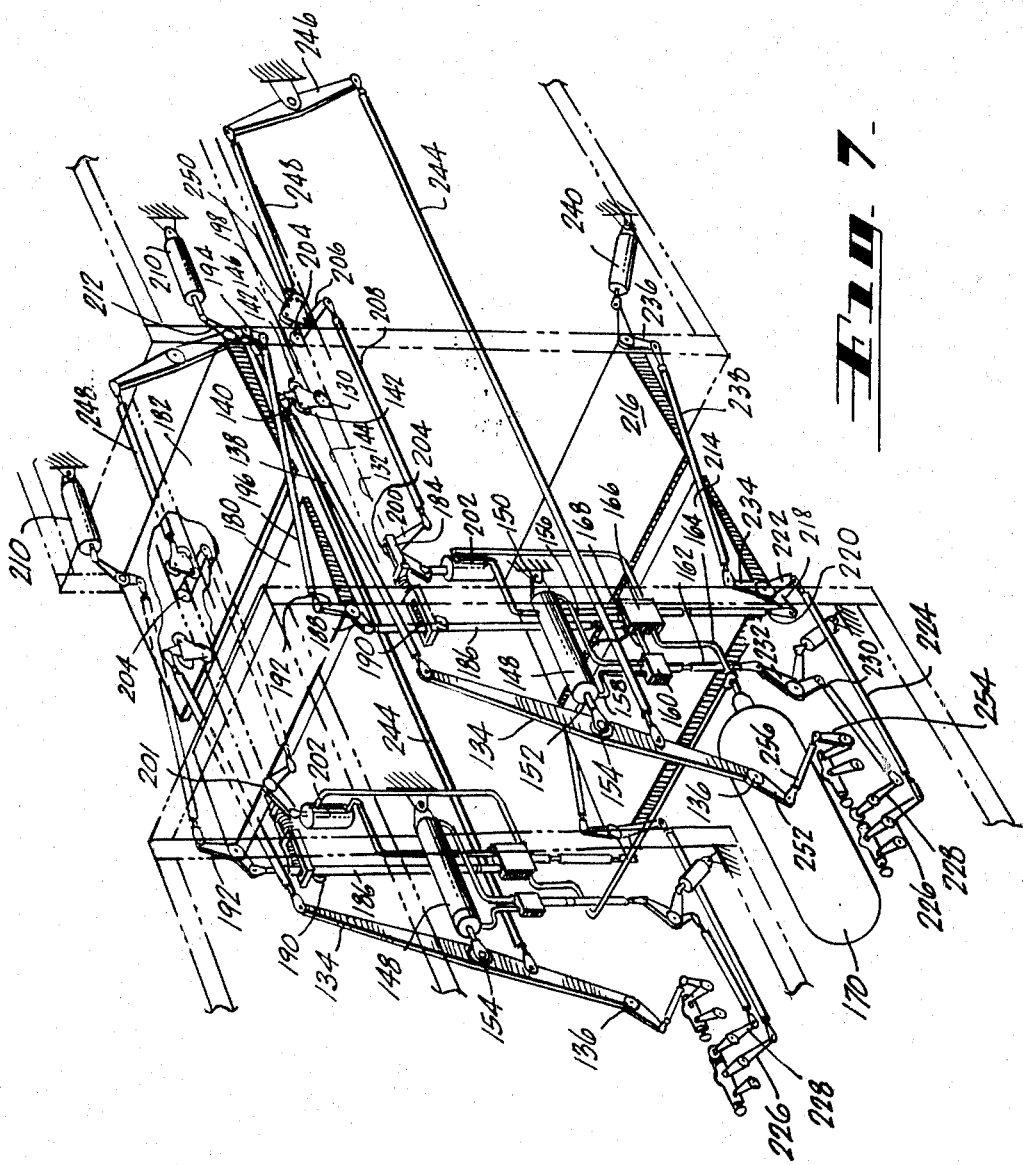

United States Patent Office 3,438,601
Patented Apr. 15, 1969

3,438,601
AIR CREW ESCAPE AND SURVIVAL SYSTEM
Robera G. McIntyre, Manhattan Beach, Calif., assignor to McDonnell Douglas Corporation, a corporation of Maryland
Filed Dec. 18, 1967, Ser. No. 691,457
Int. Cl. B64d 17/00, 1/10
U.S. Cl. 244—137
6 Claims

ABSTRACT OF THE DISCLOSURE

An emergency escape system for aircrewmen working in a shirt-sleeve environment. An automatic module advance dispenser mechanism for a series of parachutes and modules stored under the aircraft cabin floor. A crewman passes through an opening in the bottom of the airplane and into a module containing oxygen, life raft, impact bag and other essentials in a fully encapsulated "cocoon." A parachute opens and keeps the module within a safe descent velocity.

Background of the invention

Increasing deployment of large multi-place aircraft as vehicles for complex electronic systems, together with the increasing importance of such aircraft as key elements in the tactical operation in which they are used, is creating a need for realistic measures to safeguard the aircrew. This type of aircraft normally operates on missions of extended duration and the combination of a large number of crewmen and long missions poses unique problems regarding the provision of satisfactory aircrew escape facilities. A particularly important factor is that there may be considerable movement of the aircrew throughout the aircraft. For this situation the manual bailout method of escape has inherent advantages, and facilities for this method are usually provided on this type of aircraft.

Emergency escape of military aircraft crewmen has, in the past decade, progressed from over-the-side bailout, through escape slides, ballistic ejection seats, rocket catapult ejection seats, encapsulated ejection seats to complete separable nose capsules. At the present time the most acceptable and most widely used concept is the rocket catapult powered ejection seat. These seats are utilized in most fighter, attack and bomber aircraft. The applications involve both single and multiple seat installations.

Studies of providing emergency escape for crewmen of larger patrol and observation aircraft have shown the rocket ejection seat concept to be practical for a crew of up to 6 to 8 persons. However, careful placement and spacing of the seats must be observed. In larger aircraft with larger crew complements, especially where the crew must move about in a shirt-sleeve environment, ejection seat use leads to many disadvantages such as:

(1) Crewmen must wear some type of restraint and parachute harness.

(2) Crewmen must be properly restrained in their seats prior to ejection.

(3) Sequencing systems must be employed to preclude collisions between ejected crewmen, seats and canopies.

(4) A removable hatch or "eject-through" panel must be provided for each crew station. Seat relocation within the airplane is therefore very costly.

(5) The total airplane weight and cost penalty for providing ejection seats becomes significant with large crew make-up.

(6) The floor space and airplane volume requirements for each ejection seat limit the number of crewmen that can be carried in any given airplane or cabin area.

(7) Crewmen must be indoctrinated in procedures for using ejection seats.

(8) Crewmen must be wearing a helmet, oxygen mask, and protective clothing at all times in anticipation of the time that ejection is required.

For the normal manual bailout method of escape to give a reasonable chance of escape in a serious emergency, the aircrew must be wearing their equipment so that they are ready to escape when the emergency occurs. However, the wearing of parachutes, life preservers, liferaft-survival packs, oxygen sets, and (depending upon the circumstances) exposure suits is not compatible with either personal comfort or the ability to work efficiently over a long period. With present aircrew equipment there is no apparent way in which this incompatibility can be solved without compromising either the efficiency of the aircrew or their ability to escape and survive.

Aircraft mission effectiveness must take priority over other factors; therefore, the tendency is to provide escape equipment to be put on should an emergency occur. Under normal unhurried circumstances it is not difficult to put on a parachute and the other necessary items of equipment, but the situation is altered radically by the presence of any one, or a combination, of such possible factors as fire, smoke, poor visibility, aircraft maneuvers, decompression, injuries, hypoxia, panic or confusion. In such circumstances the ability of the aircrew to put on their equipment may be drastically impaired and the time required to do this becomes incompatible with the emergency situation.

The time factor must be considered of overwhelming importance since, following the onset of an emergency, a considerable portion of the available time may be consumed by the pilot or mission commander in assessing the severity of the situation. By the time it has become clear that escape is necessary, the situation already may have worsened almost to the point where escape is no longer possible.

Summary of the invention

The aircrew escape and survival system of the present invention provides for a rapid means of escape for a large aircrew complement. Escape is accomplished by means of a manual bailout system which utilizes an advanced semi-automatic form of escape slide. The escape recovery and survival equipment for each crewman is stowed beneath the aircraft floor and each crewman is automatically encapsulated in his equipment as he passes through the escape slide. The equipment provides fully automatic parachute recovery and cushioned landing, and the encapsulation "cocoon" is fully equipped to provide protection during descent and to be a complete survival shelter on land or sea. The present invention provides for rapid, unencumbered escape with a minimum of escape actions and in a minimum of escape time. This results in the increased probability that the aircrewmen would be able to complete the escape procedure under adverse conditions and before conditions become adverse. This may be done with a minimum of training and with a minimum assistance for injured or unconscious persons.

The initiation and operation of the parachute recovery system that is fully automatic, high speeds or altitude present no problem. The crewman is in a survival shelter as he leaves the aircraft, crewman immersion and liferaft ingress problems are eliminated, there is a minimum possibility of injury, loss of equipment, and the crewman can concentrate on the operation of rescue aids. When this system is available, a crewman may work without constraint and with optimum efficiency at all times. An additional advantage is in its automatic operation and landing characteristics which enable an aircraft equipped with this system to be used immediately in an emergency for the paradropping of untrained personnel and supplies.

The main advantages of this system over ejection seat and capsular escape systems are as follows:

(1) Lowest weight and cost per crewman of any escape system except over-the-side bailout or use of escape slide.

(2) No indoctrination required of the crewman.

(3) Crewman are not required to wear helmets, oxygen masks, harnesses, special protective clothing, life vests, etc.

(4) No dangerous large pyrotechnic devices required. Thus the system has no ground safety problems.

(5) Very low maintenance is required.

(6) System can be prepackaged (palletized) for the complete crew and loaded as a unit in the airplane.

(7) Only one exit hatch is required (although for expediency of escape one should be provided for each 10 to 15 crewmen).

(8) An airplane fitted with this system can at any time be used as an emergency paradrop aircraft for firefighters, ground troops, paramedics, etc. without these personnel having parachute jump training. Cargo packages of approximate size and weight of a man also can be jettisoned safely and recovered either singly or inter-mixed with personnel.

(9) After jettisoning several crewmen and/or cargo packages, the exit door can be closed and the airplane repressurized to continue its mission. The remainder of the units remain ready for use.

(10) Exact weight or body proportions of escapees are unimportant.

(11) An automatically inflated liferaft for over water recovery is furnished. The crewman lands in inflated raft.

(12) System reliability is very high due to minimum use of cartridge actuated devices and due to a minimum of actuated mechanisms.

(13) Protection from environmental conditions, i.e., cold, rain, snow, hail, sunlight, is provided the escapees while descending from high altitude and during subsequent survival after landing.

(14) Once qualified for use in one aircraft, the system can be installed in other aircraft without requalification.

(15) The possibility of the crewman becoming entangled with the parachute during its deployment is eliminated.

(16) Mid-air collision of man and ejection seat is eliminated.

Brief description of the drawings

For a more complete understanding of the structure and operation in the practice of this invention, reference is now had to the drawings, wherein:

FIGURE 1 is a schematic illustration comparing the sequence of events and time involved in the old method of escape and in an escape utilizing the present invention;

FIG. 2 is a perspective view illustrating how the present invention may be practiced without modification of a present-day cargo aircraft;

FIG. 3 is a schematic illustration showing an aircraft modified for this purpose;

FIG. 4 is a pictorial illustration of the different positions of the escape module after it leaves the aircraft;

FIG. 5 is a schematic illustration showing one form of escape cocoon;

FIG. 6 is a schematic illustration showing another form of escape cocoon; and

FIG. 7 is a perspective view of one form of apparatus for use in moving a conveyor line of escape modules into position for use.

Description of illustrative embodiments

Reference is now made to FIGURE 1 which shows, on the left-hand side, the sequence of events and time involved in utilizing a conventional escape slide. As shown on the left, a crewman 10 is shown at his tactical work station 12 at time zero when the bailout order is given. It takes approximately ten seconds to clip on his oxygen set 14 in such manner that it can be used in descent. By the time he has put on his May West 16, 25 seconds have passed. A total of 65 seconds is spent by the time chute 18 has been put on and 80 seconds have passed by the time his survival kit 20 has been secured. The crewman leaves any convenient exit 22 after 85 seconds have been consumed.

In favorable contrast, the events of escape and the time required in the performance of the present invention is shown on the right wherein crewman 24 at his work station 26 at time zero when the bailout order is given, merely takes his clip-on oxygen set 28 with him to the bailout station opening 30 within a total lapsed time of six seconds. As will be more fully disclosed hereinafter, an automatic conveyor system ensures that an escape module consisting of a cocoon 32 and parachute 34, is in position to receive and safely carry the crewman 24. These modules are positioned by means of rollers 36 along the track 38 which are in position under the opening 30 in the aircraft. As in both procedures, doors 40 and 42 serve as wind blast protection until the module and crewman is free from the aircraft. All equipment necessary for escape, recovery, survival and rescue is stowed in the modules 32 thereby eliminating the requirement for the aircrewman 24 to wear this equipment. As each crewman passes into the cocoon 32 he is automatically encapsulated by his equipment.

Referring now to FIG. 2, there is shown a container 44 mounted on an extensible trackway 46 to extend outwardly of the crago door 48 of a conventional cargo aircraft 50 wherein cargo is taken on and removed from the aircraft through the rear of the airplane. The aircraft vertical stabilizer 52 and horizontal elevators 54 are shown for the purpose of orientation. Container 44 has a door 56 at the bottom which serves as a wind blast protection panel and as a slide in the escape procedure. Container 44 is a self-contained unit wherein the parachute and cocoon modules 58, 60 are stored. This container has a platform 62 with opening 64 therein through which cargo 66 may be dropped. An operator 68 operates manual control 70 for the actuation of the door 56 and to move the cargo 66 into position where they may be released to fall through opening 64.

A general arrangement within a modified aircraft 72 is shown in FIG. 3. The equipment or escape module for each crewman 66 consists of an encapsulation bag, or cocoon 60 and a parachute 58 connected thereto. The open end of the cocoon is stretched across an escape slide entrance 74 so that the crewman 66 enters the cocoon 60 as he drops into the slide area. When he reaches the bottom of the cocoon, a sequenced release mechanism is triggered. The open end of the cocoon is closed and the parachute pack is released from the aircraft. As soon as this module is released, the remaining modules are indexed toward the slide and another cocoon is positioned in the slide ready to receive the next crewman. A complete escape installation consists of an escape slide with power operated inner and outer doors, a series of individual crew escape modules, and the power drive unit required for module advance and release.

As shown in FIG. 4, a wind blast protection door 80 extends downwardly from airplane 72, the module in position 84 has the extraction parachute 86 deployed and at position 88, the main parachute 90 is deployed, and in position 92 the main parachute 90 is in reefed condition. When the module has dropped to below 15,000 feet, as shown at 94, the main parachute 90 is disreefed and allowed to inflate fully. The floation cells 96 and impact attenuation bladders 98 on the cocoon are inflated for impact.

The escape module cocoon 60, shown in FIG. 5, is complete with a closure system, oxygen system, impact attenuation system, flotation system, and survival and rescue aids, together with the automatic parachute system. All necessary items of survival and rescue equipment are stowed in the base of the cocoon and are accessible to the occupant. From the moment the crewman enters the escape slide in the aircraft until he commences to operate his rescue aids, the only action required of the crewman is the operation of a control handle 100 to release the parachute once the cocoon has landed.

The cocoon itself consists of the encapsulation bag 102 and a base 104. The encapsulation bag has an outer skin of rubberized fabric, together with an inner thickness of lightweight insulating material, so that it will provide adequate exposure protection for descent from high altitudes and for intemperate conditions on land or sea. A transparent panel 106 is provided in the wall of the cocoon so that the crewman will not become disoriented during the descent.

The base 104 of the cocoon provides a support for the occupant and is constructed of a crushable material to give back-up cushioning on landing. Portions of the base contain the survival and rescue aids and possibly other items such as the inflation bottles for the cocoon bladder systems.

The parachute system is designed to allow for high-altitude and high-speed conditions. The system will be actuated automatically upon release of the module from the aircraft. Initially, a small extraction parachute 86 will be deployed. This will withdraw the main personnel parachute 90 from its deployment bag in a reefed condition. After a time delay to ensure that an acceptable speed has been reached, the parachute will be disreefed. This is accomplished by the use of an aneroid-controlled ballistic delay reefing line cutter, not shown. In an escape from high altitude, disreefing will be delayed until an altitude of about 15,000 feet is reached.

The impact attenuation system consists of a bladder 108 beneath the cocoon bag 102 and an inflation system such as a $CO_2$ bottle 110. The bladder has a system of blow-out plugs 112 such that impact will be cushioned progressively. The flotation system consists of a donut-shaped cell 114 encompassing the cocoon. It is planned to inflate this cell at the same time and with the same inflation system as that used for the impact attenuator.

The impact attenuation and flotation systems will be actuated when parachute disreefing occurs. The inflation pressures will be continuously controlled to allow for a landing at any altitude from sea level to 15,000 feet.

It is anticipated that the flotation bladder 114 will assist in cushioning the landing under high drift conditions where toppling may occur and the addition of small bladders 116 to protect the head area may be shown to be advantageous for extreme cases.

The oxygen system will be a simple arrangement consisting of a small oxygen bottle 118, hose 120, and simple, lightweight mask 122. The system will be actuated automatically when the module is released from the aircraft and will deliver oxygen through the mask until the bottle is exhausted. If the crewman is incapacitated and unable to use the mask, the atmosphere inside the cocoon will become enriched, thereby assisting him to retain consciousness.

In FIG. 6 is shown an alternate embodiment of the cocoon to that shown in FIG. 5. In this embodiment, the crewman is positioned on his back which provides for a low center of gravity. This makes the cocoon easier to remain upright, particularly when floating in the water, while the crewman is waiting to be rescued. While the position shown is that during descent, with the parachute lines 124 extending upwardly, and the escapee 66 is on his back, once the cocoon 60 lands in the water the balance is such that flotation cell 114 is in the water and the escapee 66 is in a slight reclining position.

The aircraft portion of this system consists of a compartment containing an escape slide, stowage space for the escape modules, and the mechanisms which will control the positioning and release of the modules. The escape slide will be similar to a conventional slide with inner and outer hatches, the outer hatch serving as a windscreen. The main functions of the mechanisms to control the modules are to advance the modules as soon as one is released and to position another cocoon in the slide ready for the next crewman.

The mechanism shown in FIG. 7 is designed to feed, deploy and release the escape modules. It is automatic in operation and is powered by a compressed gas supply independently from the aircraft source. Because of its design, a man cannot enter the escape slide until a module is fully deployed over the aircraft exit. Because the release mechanism is actuated by the upper flaps, the module cannot be released until the man is completely enclosed in the module. No further actuation of the feeding and deployment system can take place until the man and module have left the escape slide. After the man and module have left the escape slide, the mechanism is free to recommence its sequence of further module deployment. The action of the mechanism can be separated into three stages: (1) The short feed when the remaining modules are all advanced toward the escape exit a distance of one module thickness; (2) a long feed or deployment of the module which occurs when the module nearest the escape exit is expanded over the escape exit opening; (3) the release—this occurs after the man is correctly positioned in the module and the man-module is released. The short feed and long feed mechanisms are innercoupled and are driven in such manner that when the short feed is on its work stroke, the long feed is returning to position and vice versa.

The apparatus shown in FIG. 7 is in a position to deploy a cocoon over the escape opening in the aircraft. This will be done by moving the front rollers 130 of the cocoon (not shown) across the opening along a trackway 132, shown in phantom lines. Structure for performing this function is a main drive lever 134 pivotally connected to the aircraft at pivot point 136. The other end of main drive lever 134 is pivotally connected to a carriage driver 138 having a carriage 140 connected at its other end. This carriage is mounted on rollers 142 which move along a trackway 144 shown in phantom lines. Pivotally mounted on carriage 140 is a cam 146 which is engageable with the structure at the forward portion of the bag for the purpose of moving the roller 130 along the trackway 132, toward the left in FIG. 7. A main drive jack 148 is connected at pivot point 150 to the aircraft structure and includes an actuating piston rod 152 pivotally connected to the main drive lever 134 at pivot point 154. This jack is actuated by fluid pressure and has a pressure conduction line 156 for expanding the piston rod 152 outwardly and a line 158 for causing the piston 152 to withdraw into the cylinder of jack 148. These lines are connected to a direction valve 160 which is controlled by the position of selector rod 162 in determining which line 156 or 158 will be connected to the actuation pressure source 170. The pressure source 170 is connected to the direction valve 160 through conductor 164, main control valve 166 and conductor 168. Pressure source 170 preferably is a gas pressure source independent of the aircraft pressure sources.

In order to ensure that a crewman will not drop down into the slide without the benefit of a bag to catch him, upper flaps 180 and 182 are provided which will not open until the bag has been extended over the opening underneath. When the front roller 130 of the bag is in its extended position, it will move a spring-positioned bumper 184 which, when depressed by the roller, will permit the upper flaps 180, 182 to drop downwardly and open. This upper flap locking mechanism consists of a bar 186 pivotally connected to a crank 188 affixed to flap 180. Rod 186 has a projection 190 which abuts against the lower surface of bumper 184 to hold the flap 180 in a horizontal position. When front roller 130 of the cocoon strikes bumper 184, this bumper is moved so that projection 190 is free to move upwardly and thus permit flap 180 to drop down. Suitable linkage is provided to cause flap 182 to operate in a similar manner, i.e., rise and fall with flap 180. This linkage consists of an upstanding crank 192 on flap 180 and downwardly extending crank 194 on door 182 with an innerconnecting rod 196. With this linkage, door 182 is held horizontally when door 180 is horizontal and 182 is permitted to drop when door 180 drops. When the upper flaps drop, locking rod 186 also actuates a piston in the main control valve 166 which moves the piston to a flap-down position, cutting off pressure to the direction valve 160 and disabling main drive jack 148.

Provision is made to hold the forward rollers 130 and aft rollers 198 across the opening under flaps 180, 182 of the bag until the crewman is in the bag and ready for release. This mechanism consists of a crank 200, including a stop cam 201, actuated by a release jack 202. A release cam 204 is rotatably mounted adjacent the trackway 132 to engage and disengage with the rollers of the bags. This cam has a lever arm 206 which is connected to an actuating rod 208, which in turn is pivotally connected to the crank 200. When locking rod 186 has been actuated upon the forward rollers 130 striking bumper 184 to permit the upper flaps to fall downwardly, and rod 186 cuts off the air supply to the main jack 148 through the direction valve 160, the air supply to the release jack 202 is in the hold position which means that cam 201 and cam 204 retain the front and back rollers of the bag. After the upper flaps 180 and 182 have been opened to permit the crewman to go down into the bag, the flaps are then returned to their closed position by return spring box 210 which is connected to flap 182 through crank 212. As the man passes past the upper flaps, the flaps return to their original position and the main control valve 166 is activated by rod 186 to supply air to the release side of the release jack 202. Air supply to the main drive jack 148 remains cut off.

Pressure to the release side of release jack 202 causes the jack to rotate cams 201 and 204 and the man-module is free to fall from the aircraft. As the man-module passes through the lower flaps 214, 216, the rotation of the lower flaps causes the apparatus to make ready for the next escapement. This is done by actuating the main control valve 166 and reversing the main jack direction valve 160, making piston rod 152 shorten into main jack 148 to commence a new cycle. Main control valve 166 is actuated by means of a crank 218 affixed to lower flap 214 and a connecting actuator 220 operably connected to the main control valve 166. The main jack direction valve 160 is actuated by selector rod 162 which is operable by lower flap 214 through crank 222, connecting link 224, pivotal lever 226, pivotally mounted toggle 228, link 230 and crank 232.

When lower flap 214 moves, lower flap 216 moves with it through cranks 234, 236 and connecting rod 238. Spring return box 240 connected to crank 242 on flap 216 returns the lower flaps to horizontal position as shown. When the lower flap 214 returns to its normal position after the man-module has passed through, it returns the main control valve 166 to its original position, as shown in the drawing. Air is supplied to the hold side of the release jack 202 and cams 201, 204 are rotated to receive the fore and aft rollers of the next module and prevent them from leaving the trackway along which they are moved. The air supply is reconnected to the main jack drive 148. As piston rod 152 extends into jack 148, the short feed is actuated along with the long feed. The short feed moves the stacked modules forward by one module thickness. The short feed consists of an actuating rod 244 pivotally connected to a direction reversing pivotal lever 246 having at its other end a cam actuating rod 248. This rod moves cam 250 behind the next aft roller for its movement forward to release cam 146.

A crank 252 operates with drive arm 134 and is connected to crank 254 through a linkage 256. As the main jack 148 shortens, that is, the long feed moves into position to get the front rollers of the bag for movement over the opening and the short feed has moved the modules forward by one module thickness, the toggle 228 is caused to rotate counterclockwise to the position shown in the drawing and the sequence starts again.

*Operation*

Having described the structure in FIGURE 7, its sequence of operation is as follows:

As shown, the system has just completed moving the modules to the left with the short feed stroke and the long feed mechanism has just picked up the front rollers of the bag for positioning over the opening. Toggle 228 has been rotated counterclockwise to cause the reverse stroke on the main jack 148 whereby the piston 152 moves out of the jack 148. This moves arm 134 to the left in the view shown, deploying the module over the opening and the short feed returns to pick up the next module. The forward module roller 130 locks into a release cam 201 connected to bell crank 200. The innerlock between the upper flaps 180, 182 and the long feed mechanism, that is, the leftward movement of bumper 184 to permit projection 190 on rod 186 to move upwardly, releases the upper flaps 180, 182 and the crewman drops through the upper flaps and into the module. The upper flap control on main control valve 166 moves to the flap down position. This cuts off the air supply to the main jack 148 through direction valve 160 and the air supply to the release jack 202 stays on the hold side. The man continues falling into the module until he is completely contained inside and clear of the upper flaps 180, 182. The doors are returned to their original position by the spring box 210. The upper flap control valve in main control valve 166 moves to the up position and air supply to the release jack 202 is fed to the release side. Air supply to the main jack 148 is returned but is still cut off by the lower flap. The man-module is then released from cams 201 and 204. As the man and module pass through the lower flaps 214, 216, the lower flap control on the main control valve 166 moves to the flap down position. The man-module then passes the lower flaps 214, 216 and the spring box 240 returns the flaps to their original position. Air supply to the release jack 202 returns to the hold side and the air supply to the main jack 148 is re-established. The main jack then shortens and the sequence starts again.

What is claimed is:
1. An aircrew escape and survival system comprising:
   an opening in an aircraft through which an aircrewman must pass in an escape,
   a plurality of parachutes and a module connected to each parachute, said parachutes and modules being stored in proximity to said opening,
   first means for placing one of said modules over said opening to receive said aircrewman,
   second means for sequentially placing successive modules near said opening for subsequent use by other aircrewmen, and
   third means for preventing passage of an aircrewman through said opening until one of said modules is over said opening to receive said aircrewman.
2. An aircrew escape and survival system as in claim 1 wherein said module contains equipment for protection during descent and for land and sea survival.

3. An aircrew escape and survival system as in claim 2 wherein said module has flotation cells, impact cushioning materials, and air cells with impact blow-out plugs to lessen landing shock.

4. An aircrew escape and survival system as in claim 1 wherein said first and second means are actuated upon the exit of a module and aircrewman therein from said opening.

5. An aircrew escape and survival system as in claim 1 wherein said third means includes flaps mounted over said opening and locking means for preventing movement of said flaps, said first means being operable upon placement of a module over said opening to release said locking means and permit movement of said flaps.

6. An aircrew escape and survival system as in claim 1, and release means for releasing said module and parachute after an aircrewman is positioned within said module.

References Cited

UNITED STATES PATENTS

| | | | |
|---|---|---|---|
| 2,389,160 | 11/1945 | Manson et al. | 244—137 |
| 2,426,862 | 9/1947 | Cunningham | 244—137 |
| 2,801,062 | 7/1957 | Leahy et al. | 244—137 X |

MILTON BUCHLER, *Primary Examiner.*

THOMAS W. BUCKMAN, *Assistant Examiner.*

U.S. Cl. X.R.

188—1; 244—136, 138, 147